May 13, 1924.
S. A. STAEGE
1,493,904
LOAD REGULATOR SYSTEM
Filed Sept. 19, 1919
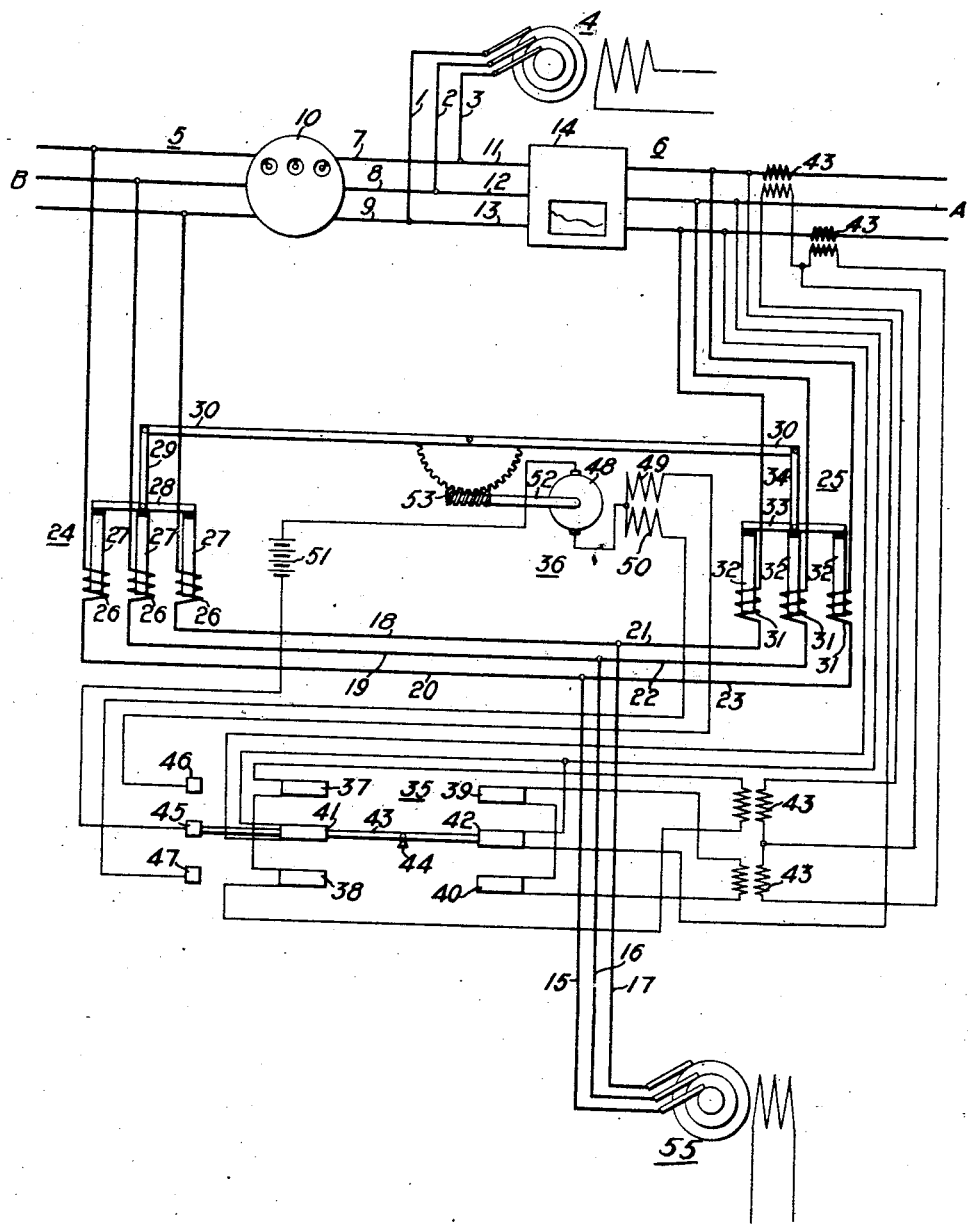
WITNESSES:
H. J. Shelhamer
W. B. Wells
INVENTOR
Stephen A. Staege
BY
Wesley G. Carr
ATTORNEY Patented May 13, 1924.

1,493,904

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

LOAD-REGULATOR SYSTEM.

Application filed September 19, 1919. Serial No. 324,955.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Load-Regulator Systems, of which the following is a specification.

My invention relates to load-regulator systems and particularly to load-regulator systems for preventing peak loads on feeder circuits.

One object of my invention is to provide a load-regulator system that shall have two feeder circuits connected to a main and to an auxiliary source of supply and that shall control the auxiliary source to govern the amount of power supplied by the main source to one of the feeder circuits.

In many instances, power companies supply current to large consumers of power not only on the basis of the watt hour consumption but also on the basis of the highest peak load which is obtained during the month. Inasmuch as a constant load can be purchased at a much cheaper rate on the peak-load basis than on the watthour basis, it is desirable, on the part of the consumer of power, to purchase power on the peak-load basis for all constant load that he may carry and to purchase all power above a certain amount on the watthour basis.

In a load-regulator system constructed in accordance with my invention, two feeder circuits are connected to the main source of supply. One of the feeder circuits is connected to a watthour meter in order to pay for all current passing through it on the watthour basis and the other feeder circuit is connected to a curve-drawing meter in order to pay for all current passing through such circuit on the peak-load basis. An auxiliary source of supply which may be of any suitable size is connected to the two feeder circuits and the division of power from the auxiliary source is controlled in accordance with the electrical condition of the main source to maintain the power below a predetermined value which is supplied by the main source to the feeder circuit having a curve-drawing meter.

In practicing my invention, a Kelvin balance, or other suitable contact-making instrument, is operated in accordance with the power supplied by the main source to the feeder circuit in which the current is paid for on the peak-load basis. The Kelvin balance operates a motor in a clockwise and in a counter-clockwise direction for varying the impedance included in the connections between the auxiliary source of supply and the two feeder circuits. Thus, the division of power from the auxiliary source is varied in accordance with the power supplied by the main source to the feeder circuit having a curve-drawing meter. Accordingly, in this manner, the amount of power supplied from the main source to the feeder circuit, which is on the peak-load basis, is varied to maintain the power substantially constant which is supplied from the main source to this circuit.

The single figure of the accompanying drawing is a diagrammatic view of a load-regulator system constructed in accordance with my invention.

Referring to the drawing, a main supply circuit, comprising conductors 1, 2 and 3, is connected to any suitable source of supply, such as a generator 4, and is connected to two feeder circuits 5 and 6. The feeder circuit 5 comprises conductors 7, 8 and 9 and is provided with a watthour meter 10 for measuring the amount of current supplied to it from the main supply circuit comprising conductors 1, 2 and 3. The feeder circuit 6 comprises three conductors 11, 12 and 13 and is connected to a curve-drawing meter 14 in order that the peak-load supplied by the main source to the circuit 6 may be indicated for paying for the current on the peak-load basis.

An auxiliary source of supply comprising a generator 55, and conductors 15, 16 and 17 is connected to the feeder circuit 5 by means of conductors 18, 19 and 20 and is connected to the feeder circuit 6 by means of conductors 21, 22 and 23. An inductive device 24 is provided for varying the impedance of the circuit comprising conductors 18, 19 and 20, and a similar inductive device 25 is provided for varying the impedance of the circuit comprising conductors 21, 22 and 23.

The inductive device 24 is provided with three coils 26 which are disposed in the circuits 18, 19 and 20 and the impedances of which are varied by means of plungers 27. The plungers 27 are connected to an arm 28 which, in turn, is pivotally connected, by a link 29, to an operating arm 30. The inductive device 25 comprises coils 31 which are disposed in the conductors 21, 22 and 23, and three plungers 32 which vary the impedances of the coils 31. The plungers 32 are connected to an arm 33 which is pivotally connected, by a link 34, to the operating arm 30.

A Kelvin balance 35, or any other suitable contact-making instrument, is operated in accordance with the power supplied from the main source to the feeder circuit 6 and serves to operate a motor 36 which governs the operation of the arm 30. The Kelvin balance 35 comprises four stationary coils 37, 38, 39 and 40 and two movable coils 41 and 42 which are mounted upon a contact arm 43. The contact arm 43 is fulcrumed at 44 and carries a main contact member 45 which is adapted to engage the contact members 46 and 47 according to the operative position of the arm. The coils 37 to 40, inclusive, of the Kelvin balance are connected to the conductors 11 and 13 of the feeder circuit 6 by means of the current transformers 43 in order to be energized in accordance with the current flowing through the conductors 11 and 13. The movable coils 41 and 42 are connected to the supply circuit 6 in order to be energized in accordance with the potentials obtaining across the supply conductors 11, 12 and 13.

The motor 36 comprises an armature 48 and two differential field windings 49 and 50. The armature 48 is adapted to be connected in circuit with the field winding 50 to a battery 51 upon engagement between the contact members 45 and 47 and is connected in circuit with the field winding 49 to the battery 51 upon engagement between the contact members 45 and 46. Upon engagement between the contact members 45 and 47, the motor 36 is assumed to rotate in a clockwise direction and, upon engagement between the contact members 45 and 46, the motor is assumed to rotate in a counter-clockwise direction. The armature 48 is provided with a shaft 52 which is connected to the operating arm 30, by means of a worm gearing 53.

Upon operation of the motor 36 in a clockwise direction, the operating arm 30 is moved in a counter-clockwise direction. Thereupon, the inductive device 25 is operated to decrease the impedance in the supply conductors 21, 22 and 23, and the inductive device 24 is operated to increase the impedance in the conductors 18, 19 and 20. Consequently, the amount of power supplied from the auxiliary supply circuit, comprising conductors 15, 16 and 17, to the feeder circuit 6 is increased, and the amount of power supplied from the auxiliary source to the feeder circuit 5 is decreased.

Upon operation of the motor 36 in a counter-clockwise direction, the operating arm 30 is moved in a clockwise direction to increase the impedance included in the conductors 21, 22 and 23 and to decrease the impedance included in the conductors 18, 19 and 20. Consequently, the amount of power supplied from the auxiliary source to the feeder circuit 6 is decreased and the amount of power supplied to the feeder circuit 5 from the auxiliary source is increased.

Assuming the main source of supply to be furnishing power to the feeder circuit 6 above a predetermined value, the Kelvin balance 35 is operated to effect engagement between the contact members 45 and 47. Upon engagement between the contact members 45 and 47, a circuit is completed from the battery 51 through the armature 48 and the field winding 50. Thereupon, the motor 36 is operated in a clockwise direction to move the operating arm 30 in a counter-clockwise direction. Consequently, the inductive device 25 decreases the impedance in the conductors 21, 22 and 23, and the inductive device 24 increases the impedance in the conductors 18, 19 and 20. Thus, an increased amount of the load on the feeder circuit 6 is so carried by the auxiliary source comprising conductors 15, 16 and 17 as to prevent the main source from supplying power above a predetermined value to the feeder circuit 6. The inductive device 24 increases the impedance in the conductors 18, 19 and 20 to decrease the amount of power supplied from the auxiliary source to the feeder circuit 5.

In case the amount of power supplied by the main source to the feeder circuit 6 falls below normal value, the Kelvin balance 35 is operated to effect engagement between the contact members 45 and 46. Upon engagement between such contact members, the motor 36 is operated in a counter-clockwise direction to move the operating arm 30 in a clockwise direction. Thereupon, the inductive device 25 is operated to increase the impedance in the conductors 21, 22 and 23, and the inductive device 24 is operated to decrease the impedance included in the conductors 18, 19 and 20. Consequently, the amount of power supplied from the auxiliary source to the feeder circuit 6 is decreased to increase the amount of power supplied from the main source to normal value.

Although I have illustrated inductive devices for varying the impedances of the conductors 18 to 23, inclusive, it is to be understood that any other well-known means may be provided in place of the inductive devices for varying the impedances of such circuits.

Modifications in the system and arrangement and location of parts may be made within the spirit and scope of my invention, and such modifications are intended to be covered by the appended claims.

I claim as my invention:

1. In a load-regulator system, the combination comprising a main source of supply and an auxiliary source of supply, two feeder circuits connected to said sources, and means governing the division of the output from the auxiliary source to the feeder circuits for controlling the power supplied by the main source to one of the feeder circuits.

2. In a load-regulator system, the combination comprising a main source of supply and an auxiliary source of supply, two feeder circuits connected to said sources, and means for controlling the output of the auxiliary source to maintain the power supplied by the main source to one of the feeder circuits below a predetermined amount.

3. In a load-regulating system, a main source of supply and an auxiliary source of supply, two feeder circuits connected to said sources, and means for so varying the ratio of power supplied by the auxiliary source to the feeder circuits as to maintain the power supplied by the main source to one of the feeder circuits below a predetermined amount.

4. In a load-regulating system, a main source of supply and an auxiliary source of supply, a plurality of feeder circuits connected to said sources, and means controlled by the power supplied by the main source to one of the feeder circuits for controlling the division of the power supplied from the auxiliary source to the feeder circuits to control the power supplied by the main source to another one of the feeder circuits.

5. In a load-regulating system, the combination comprising a main source of supply, two feeder circuits connected to said main source, an auxiliary source of supply connected to said feeder circuits, and means operated in accordance with the power supplied by the main source to one of the feeder circuits for varying the impedance of the circuit comprising the connections between the auxiliary source and the feeder circuits to maintain the power supplied by the main source to one of the feeder circuits below a predetermined amount.

6. In a load-regulating system, the combination with a main source of supply and two feeder circuits connected to said main source of supply, of an auxiliary source of supply, and means controlled in accordance with the electrical condition of the main source for governing the division of the output from the auxiliary source to the feeder circuits.

7. In a load-regulating system, the combination comprising a main source of supply and an auxiliary source of supply, a plurality of feeder circuits connected to said sources, and means controlled by the power supplied by the main source to one of the feeder circuits for governing the division of the output from the auxiliary source to the feeder circuits.

8. In a load-regulating system, the combination with a main source of supply and an auxiliary source of supply, and two feeder circuits connected to said sources, of a motor-operated device controlled in accordance with the power supplied by the main source to one of the feeder circuits, and means operated by said device for varying the impedance of the circuit comprising connections between the auxiliary source and the feeder circuits to control the division of power from the auxiliary source to the feeder circuits.

9. In a load-regulator system, the combination with a main source of supply and an auxiliary source of supply, and two feeder circuits connected to said sources, of a main control element operated in accordance with the power supplied from the main source to one of said feeder circuits, a motor controlled by said element, and means controlled by said motor for varying the impedance of the circuit comprising the connections between the auxiliary source and the feeder circuits to control the power supplied from the main source to one of the feeder circuits.

10. In a load-regulating system, the combination comprising a main source of supply and an auxiliary source of supply, a plurality of feeder circuits, and means for controlling the ratio of power supplied by the auxiliary source to the respective feeder circuits.

11. In a load-regulating system, a main source of supply and an auxiliary source of supply, a plurality of feeder circuits connected thereto, and means for automatically controlling the division of power delivered by the auxiliary source between the respective feeder circuits.

12. In a load-regulating system, a main source of supply, an auxiliary source of supply, a plurality of feeder circuits connected thereto, and means for automatically distributing the load of said feeder circuits to balance the power delivered by said auxiliary source to the respective feeder circuits so as to maintain the electrical characteristics of said main source of supply substantially constant.

13. In a load-regulating system, a main source of supply and an auxiliary source of supply, a plurality of feeder circuits connected thereto, and means for distributing the power delivered by said auxiliary source to the respective feeder circuits in accordance with the demand thereof.

14. In a load-regulating system, the combination with two independent sources of supply and a plurality of feeder circuits connected thereto, of means for automatically distributing the power delivered by one of said sources to the respective feeder circuits in accordance with the load demand thereof.

15. In a load-regulating system, the combination comprising two independent sources of supply, a plurality of feeder circuits connected to said sources, and means controlled in accordance with the electrical condition of a portion of said feeder circuits for governing the distribution of the output from one of said sources to the respective feeder circuits.

16. In a system for maintaining substantially constant the power delivered by a variable source of supply to a plurality of feeder circuits, the combination with said source and said feeder circuits, of an auxiliary source of supply, and means for controlling the output of said auxiliary source in accordance with the load demand upon said feeder circuits.

17. In a system for maintaining substantially constant the power delivered by a variable source of supply to a plurality of feeder circuits, the combination with said source and said feeder circuits, of an auxiliary source of supply, and means for controlling the output of said auxiliary source to divide said output between said feeder circuits.

In testimony whereof, I have hereunto subscribed my name this 6th day of Sept., 1919.

STEPHEN A. STAEGE.